United States Patent
Kim et al.

(10) Patent No.: US 8,583,975 B2
(45) Date of Patent: Nov. 12, 2013

(54) PACKET COMBINING DEVICE AND METHOD FOR COMMUNICATION SYSTEM USING HYBRID AUTOMATIC REPEAT REQUEST

(75) Inventors: Hyuk Kim, Daejeon (KR); In San Jeon, Daejeon (KR); Seong Min Kim, Daejeon (KR); Bon Tae Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 57 days.

(21) Appl. No.: 13/270,433

(22) Filed: Oct. 11, 2011

(65) Prior Publication Data

US 2012/0089882 A1   Apr. 12, 2012

(51) Int. Cl.
*G08C 25/02*   (2006.01)

(52) U.S. Cl.
USPC .......................................................... 714/748

(58) Field of Classification Search
USPC .......................................................... 714/748
See application file for complete search history.

(56) References Cited

U.S. PATENT DOCUMENTS

| 6,307,901 | B1 | 10/2001 | Yu et al. | |
|---|---|---|---|---|
| 2010/0180173 | A1* | 7/2010 | Batra et al. | 714/751 |
| 2010/0211842 | A1* | 8/2010 | Moon et al. | 714/748 |
| 2011/0173508 | A1* | 7/2011 | Wehinger | 714/748 |

FOREIGN PATENT DOCUMENTS

| KR | 1020070053504 A | 5/2007 |
|---|---|---|
| KR | 1020100009185 A | 1/2010 |
| KR | 10-2010-0092510 A | 8/2010 |

OTHER PUBLICATIONS

Claude Berrou et al., "Near Shannon Limit Error-Correcting Coding and Decoding: Turbo-Codes (1)", May 1993, pp. 1064-1070, IEEE, Geneva, Switzerland.
Steven S. Pietrobon et al., "A Simplification of the Modified Bahl Decoding Algorithm for Systematic Convolutional Codes", Nov. 1994, pp. 1073-1077, ISITA, Syndey.
L.R. Bahl et al., "Optimal Decoding of Linear Codes for Minimizing Symbol Error Rate", IEEE Transactions on Information Theory, Mar. 1974, pp. 284-287, vol. IT-20.
Joachim Hagenauer et al., "A Viterbi Algorithm with Soft-Decision Outputs and its Applications", Nov. 1989, pp. 47.1.1-47.1.7. IEEE, Dallas.
Claude Berrou et al., "A Low Complexity Soft-Output Viterbi Decoder Architecture", May 1993, pp. 737-740, ICC, Geneva, Switzerland.
Joachim Hagenauer et al., "Decoding "Turbo-Codes" with the Soft Output Viterbi Algorithm", 1994, pp. 164, IEEE.

* cited by examiner

*Primary Examiner* — Albert Decady
*Assistant Examiner* — Enam Ahmed

(57) ABSTRACT

A packet combining device for a communication system using hybrid automatic repeat request (HARQ) includes: a HARQ buffer; a combiner configured to combine data which is previously received and stored in the HARQ buffer with newly-received data; and a channel decoder configured to attempt channel decoding by using the combined received data provided from the combiner and provide one or more of log likelihood ratios (LLRs) computed for a systematic bit and a parity bit of the combined received data to the combiner such that the one or more LLRs are combined with the data used for channel decoding.

13 Claims, 5 Drawing Sheets

PACKET COMBINING DEVICE AND METHOD FOR COMMUNICATION SYSTEM USING HYBRID AUTOMATIC REPEAT REQUEST

CROSS-REFERENCES TO RELATED APPLICATIONS

The present application claims priority under 35 U.S.C 119(a) to Korean Application No. 10-2010-0098999, filed on Oct. 11, 2010 and Korean Application No. 10-2011-0098483, filed on Sep. 28, 2011 in the Korean intellectual property Office, which is incorporated herein by reference in its entirety set forth in full.

BACKGROUND

Exemplary embodiments of the present invention relate to a packet combining device and method for a communication system using hybrid automatic repeat request (HARQ).

As the communication system develops and information to be transmitted contains multimedia information, it becomes more important to transmit information quickly and effectively. However, an information loss may be caused by noise, fading, or interference occurring in a communication channel. In order to effectively overcome an error caused by the information loss, it is necessary to use error correction coding.

The error correction coding refers to a technology in which a transmitter adds a parity bit to an information bit to transmit, and effectively decodes bits received through a channel, thereby increasing the reliability of the information bit.

In order to overcome a channel error occurring in a digital communication system, an error correction technology using turbo codes has been first proposed by Claude Berrou, in 1993. An error correction ability of the turbo codes has a characteristic in which bit-error rate (BER) performance is improved according to a repeat number, and it is known that when a sufficient number of iterations are performed, error correction may be achieved around a channel capacity published by C. E. Shannon [refer to C. Berrou, A. Glavieux and P. Thitimajshima, "Near Shannon limit error correcting coding and decoding: turbo-codes," ICC 1993, Geneva, Switzerland, pp. 1064-1070 May 1993.].

A basic decoder of a turbo decoder is implemented by using a MAP (Maximum A Posteriori) algorithm or SOVA (Soft Output Viterbi Algorithm).

The MAP algorithm known as a BCJR algorithm was used as a basic decoding algorithm of a turbo decoder which has been first published by Claude Berrou [BCJR algorithm has been disclosed in L. R. Bahl, J. Cocke, F. Jelinek and J. Raviv, "Optimal decoding of linear codes for minimizing symbol error rate," IEEE Transactions on Information Theory, Vol IT-20, pp 284-287, March 1974.].

Furthermore, the SOVA has been proposed by J. Hagenauer [refer to J. Hagenauer, "A Viterbi algorithm with soft-decision outputs and its application", Proc. GLOBE-COM'89 Dallas, Tex., pp 47.1.1-47.1.7, November 1989.], and the architecture of a turbo decoder using the SOVA as a basic decoder has been published by Berrou [refer to C. Berrou, P. Adde, E. Angui and S. Faudeil "A low complexity soft-output Viterbi decoder" ICC 1993, Geneva, Switzerland, pp 737-740, May 1993.].

In general, it is known that a turbo decoder using the MAP algorithm is two to four times more complex than a turbo decoder using the SOVA in terms of computational complexity, and is more excellent by 0.5 dB to 0.7 dB in terms of performance. Meanwhile, the architecture of a turbo decoder using a modified Log-MAP algorithm, which is obtain by simplifying a Log-MAP algorithm to facilitate hardware implementation, has been published by S. S. Pietrobon [refer to S. S. Pietrobon and S. A. Barbulescu, "A simplification of the modified Bahl decoding algorithm for systematic convolutional codes," ISITA 1994, Sydney, NSW, pp 1073-1077, November 1994.]. Furthermore, since the existing Log-MAP algorithm is difficult to implement, Sub-Log-MAP and Max-Log-MAP algorithms have also been published to reduce a computational amount while accepting a performance reduction.

The turbo codes have been adopted to perform error correction for high-speed data transmission requiring a low BER in the LTE (Long Term Evolution) standard which is a next-generation mobile communication system as well as the current mobile communication system, and adopted as the error correction standard of a digital broadcasting communication system.

In general, a turbo decoder calculates only a log likelihood ratio (LLR) of a systematic part. Referring to FIG. 1, however, U.S. Pat. No. 6,307,901 of Motorola has disclosed a technical idea in which a turbo decoder computing an LLR of a parity bit is used to feedback the LLR, thereby improving the performance of the turbo decoder.

The HARQ scheme is an advanced form of the ARQ scheme and is a method of attempting a retransmission to reduce an error and loss of a packet. In the HARQ, the information of previously-transmitted packets is utilized to retransmit a packet, in order to increase the reliability of the retransmitted packet.

The HARQ scheme may be divided into a chase combining (CC) scheme and an incremental redundancy (IR) scheme.

The CC scheme utilizes both signal information of a retransmitted packet and previously-transmitted packets. At this time, an initially-transmitted original packet is transmitted as the retransmitted packet. That is, since the original packet and the retransmitted packet are combined to attempt reception, a unique combining effect of the HARQ scheme may be obtained.

Furthermore, the IR scheme uses a coding scheme such as turbo codes, rate compatible punctured convolutional (RCPC) codes, or low density parity check (LDPC) codes. In the IR scheme, information which is to be transmitted by a transmitter is coded to generate a redundancy information block, only an original packet excluding redundancy information is transmitted at the initial transmission, and the redundancy information block is transmitted instead of the entire original packet, when the transmission fails. That is, the redundancy information generated by the coding is transmitted for a retransmission request of the IR scheme, instead of the original packet. At this time, a receiver receives only the original packet at the initial transmission, and attempts reception by combining the original packet and the retransmitted packets when the redundancy block is received for the retransmission request. Therefore, a unique combining effect of the HARQ scheme and a coding gain may be obtained.

However, when the HARQ scheme is performed according to the conventional schemes, data obtained by combining previously-received data and newly-received data is inputted to a channel decoder. In this case, although the unique combining effect of the HARQ and the coding gain are obtained, the data improved by the channel decoder cannot be used.

Therefore, there is demand for a method of using the high-quality data improved by the channel decoder.

The related art of the present invention has been disclosed in U.S. Pat. No. 6,307,901 (2001 Oct. 23).

SUMMARY

An embodiment of the present invention relates to a packet combining device and method using a channel decoder which computes an LLR for a parity bit as well as an LLR for a systematic bit, in order to use high-quality data improved by a channel decoder.

In one embodiment, a packet combining device for a communication system using HARQ includes: a HARQ buffer; a combiner configured to combine data which is previously received and stored in the HARQ buffer with newly-received data; and a channel decoder configured to attempt channel decoding by using the combined received data provided from the combiner and provide one or more of LLRs computed for a systematic bit and a parity bit of the combined received data to the combiner such that the one or more LLRs are combined with the data used for channel decoding.

The data which is previously received and stored in the HARQ buffer may be maintained for combining during the next retransmission, when the channel decoding of the channel decoder fails.

The HARQ buffer may store data obtained by combining the combined received data with the one or more of the LLRs for the systematic bit and the parity bit, which are provided from the channel decoder, through the combiner.

The channel decoder may include an iterative decoder, and may use one or more algorithms selected from the group consisting of BCH codes, Reed-Solomon codes, a SOVA, and a MAP algorithm.

In another embodiment, a packet combining method for a communication system using HARQ includes: combining, by a combiner, data which is previously received and stored in a HARQ buffer with newly-received data; performing, by a channel decoder, channel decoding by using the combined received data provided from the combiner; and providing, by the channel decoder, one or more of LLRs computed for a systematic bit and a parity bit of the combined received data to the combiner such that the one or more LLRs are combined with the data used for channel decoding, when the channel decoding fails.

The HARQ buffer may store data obtained by combining the combined received data with the one or more of the LLRs for the systematic bit and the parity bit, which are provided from the channel decoder, through the combiner.

The channel decoder may include an iterative decoder, and may use one or more algorithms selected from the group consisting of BCH codes, Reed-Solomon codes, a SOVA, and a MAP algorithm.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. The present invention may, however, be embodied in different forms and should not be construed as limited to the embodiments set forth herein, but it should be understood that the idea of the present invention should be construed to extend to any alterations, equivalents and substitutes besides the accompanying drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Although terms like a first and a second are used to describe various elements, the elements are not limited to the terms. The terms are used only to discriminate one element from another element.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise", "comprising", "have" and/or "having", when used herein, specify the presence of stated features, integers, steps, operations, elements, and/or components, but do not preclude the presence or addition of one or more other features, integers, steps, operations, elements, components, and/or groups thereof.

Furthermore, terms such as " . . . part", " . . . unit", and " . . . module" mean a unit which processes one or more functions or operations, and may be implemented by hardware, software, or a combination of hardware and software.

When it is determined that a specific description for the related known technology unnecessarily obscures the purpose of the present invention, the detailed descriptions thereof will be omitted.

As described above, the HARQ scheme may be divided into the CC scheme and the IR scheme, but the present invention is not limited to any one of the HARQ schemes.

Figure 1:
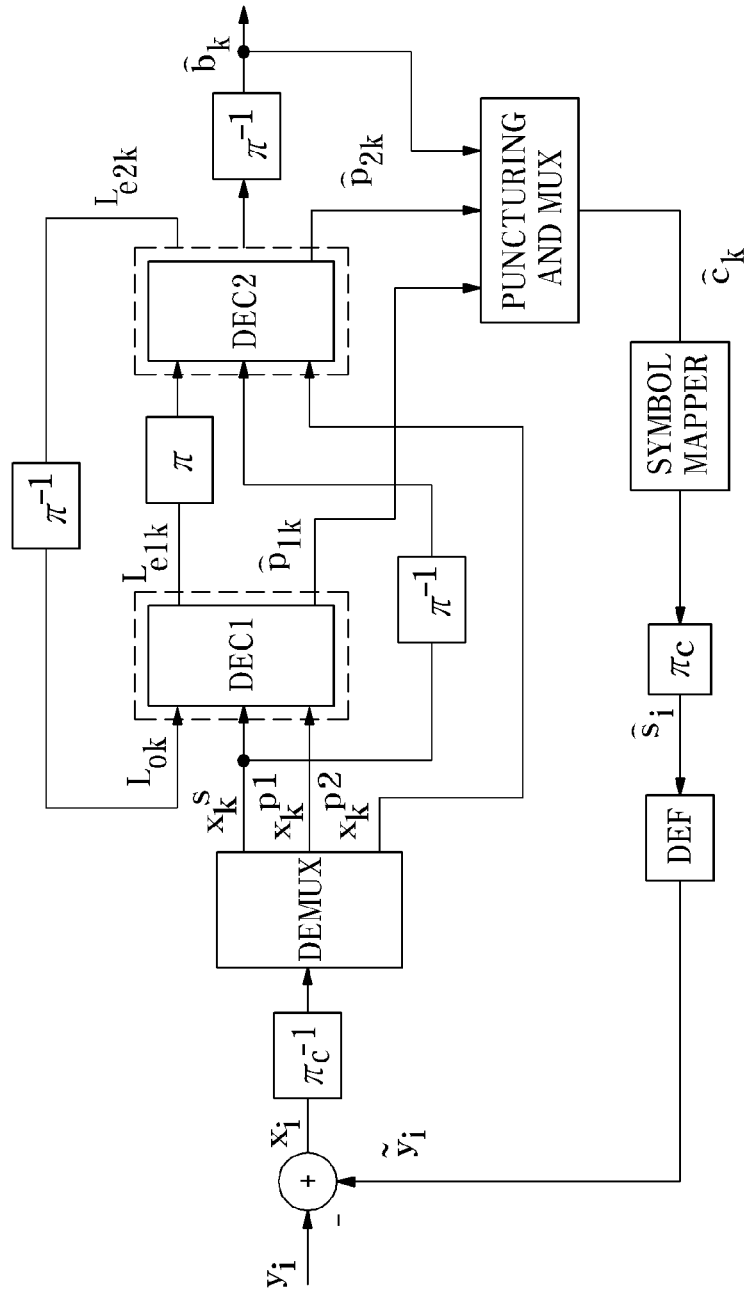
FIG. 1 is a configuration diagram of a conventional turbo decoder computing a parity LLR.
Figure 2:
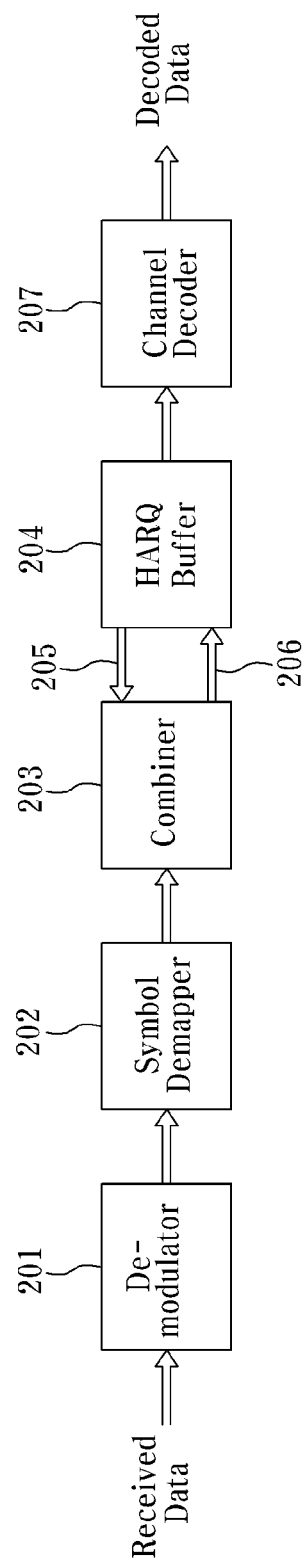
FIG. 2 is a configuration diagram of a conventional HARQ device.

FIG. 2 is a configuration diagram of a conventional HARQ device.

Referring to FIG. 2, the HARQ device includes a demodulator 201, a symbol demapper 202, a combiner 203, a HARQ buffer 204, and a channel decoder 207.

Data received through a channel is demodulated by the demodulator 201 and demapped by the symbol demapper 202.

The demapped data is combined with previously-received data by the combiner 203. As the combining method between the demapped data and the previously-received data, a variety of conventional combining methods such as a linear combining method and so on may be selectively combined and used.

In the case of an initial transmission, the HARQ buffer 104 does not have data which were previously received and stored. Therefore, the combiner 203 only stores data without combining.

However, when data which were previously received and stored exist in the HARQ buffer 104, the data are transmitted to the combiner 203 through a path 205, and the combiner 203 combines newly-received data and the data provided from the HARQ buffer 204 and then inputs the combined data to the channel decoder 207 through a path 206.

The channel decoder 207 attempts channel decoding by using the combined data. When the channel decoding is successfully performed, the content of the HARQ buffer 204 is discarded, and when the channel decoding fails, the content of the HARQ buffer 204 is maintained to perform combining during the next retransmission.

At this time, the data stored in the HARQ buffer 204 may obtain the unique combining effect of the HARQ scheme and the coding gain, but cannot use the data improved by the channel decoder 207.

Figure 3:
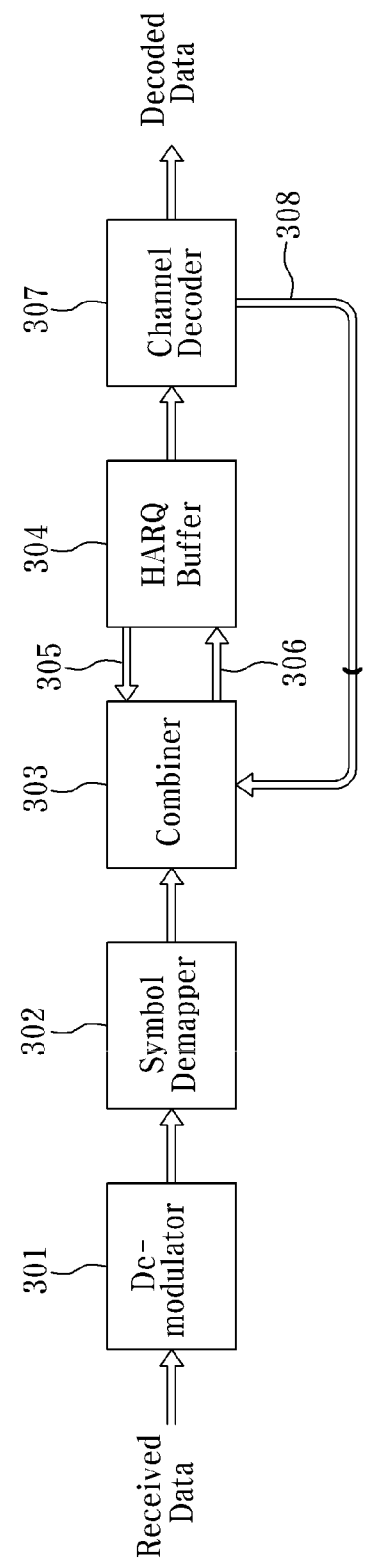
FIG. 3 is a configuration diagram of a HARQ device using a channel decoder in accordance with an embodiment of the present invention.

FIG. 3 is a configuration diagram of a HARQ device using a channel decoder in accordance with an embodiment of the present invention.

Referring to FIG. 3, the HARQ device includes a demodulator 301, a symbol demapper 302, a combiner 303, a HARQ buffer 304, and a channel decoder 307.

The demodulator 301 demodulates data received through a channel, and the symbol demapper 302 demaps the demodulated data. Furthermore, the combiner 303 combines the demapped data with data which were previously received and stored in the HARQ buffer 304. As the combining method, a variety of conventional combining methods such as a linear combining method and so on may be selectively combined and used.

In the case of an initial transmission, the HARQ buffer 304 does not have data stored therein. Therefore, the combiner 303 only stores the data without combining the data.

However, when the data which were previously received and stored exist in the HARQ buffer 304, the data are transmitted to the combiner 303 through a path 305. The combiner 203 combines newly-received data and the data provided from the HARQ buffer 304 and then inputs the combined data to the channel decoder 307 through a path 306.

Here, any decoders may be used as the channel decoder, as long as they can compute an LLR for an inputted bit. For example, the channel decoder may include an iterative decoder such as a turbo decoder or an LDPC decoder. Furthermore, an algorithm used in the channel decoder may also include BCH codes, Reed-Solomon codes, a SOVA, a MAP algorithm and so on, and are not limited thereto.

The channel decoder 307 is configured to perform channel decoding by using the combined data. When the channel decoding is successfully performed, the content stored in the HARQ buffer 304 is removed, and when the channel decoding fails, the content of the HARQ buffer 304 is maintained to perform combining during the next retransmission.

At this time, the channel decoder 307 provides an LLR computed for an input bit through a path 308 such that the LLR is combined with the received data used for decoding. In this case, as described above, a variety of conventional combining methods such as a linear combining method may also be selectively combined and used as the combining method.

When the data are combined, the order of the combined LLRs may be rearranged or scaled according to the order of the received data. In this case, since the orders may differ depending on each case, the rearranging or scaling may be performed according to each condition. Furthermore, only an LLR for a systematic bit may be combined, only an LLR for a parity bit may be combined, or both LLRs may be combined. Therefore, the combining may be performed according to each case.

Finally, the HARQ buffer 304 stores data obtained by combining the data combined with received symbols with the data improved by the channel decoder 307. Accordingly, it is possible to obtain the gain improved by the channel decoder as well as the unique combining effect of the HARQ scheme and the coding gain.

Figure 4:
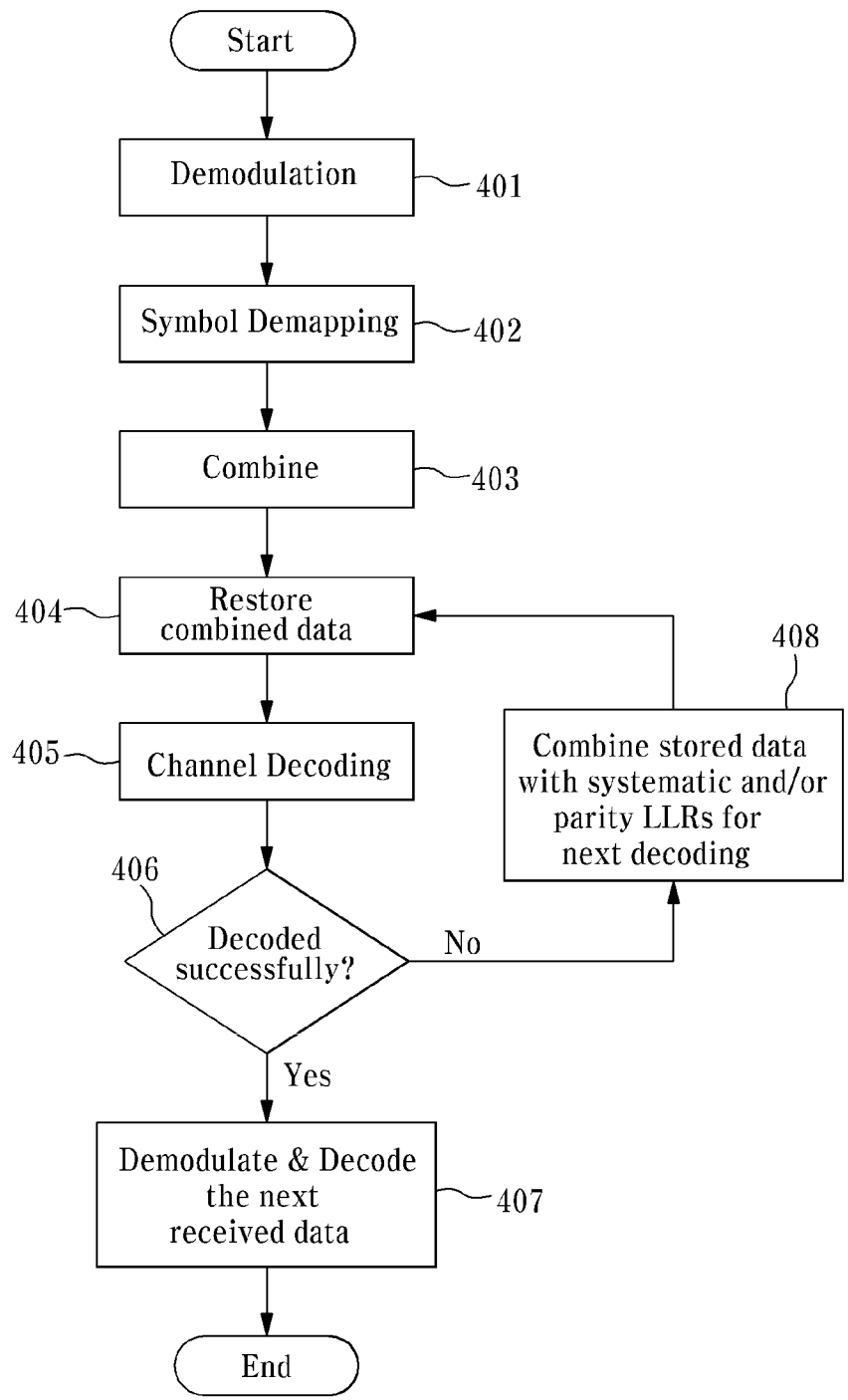
FIG. 4 is a flow chart showing a packet combining method in accordance with the embodiment of the present invention.

FIG. 4 is a flow chart showing a packet combining method in accordance with the embodiment of the present invention.

Referring to FIG. 4, the decoder 301 demodulates received data at step S401, the symbol demapper 302 demaps the received data at step S402, the combiner 303 combines the demapped result with previous data at step S403, and the channel decoder 307 performs channel decoding on the result at step S405.

When it is determined at step S406 that the channel decoding was successfully performed by the channel decoder 307, the next received data is repetitively demodulated and decoded.

However, when it is determined at the step S406 that the channel decoding failed, the process proceeds to step S408 in which LLRs generated as the current decoding result are provided to the combiner 303 to combine the LLRs with the received data, and the result is stored in the HARQ buffer 304. The stored result is combined with subsequently received data and then decoded.

Figure 5:
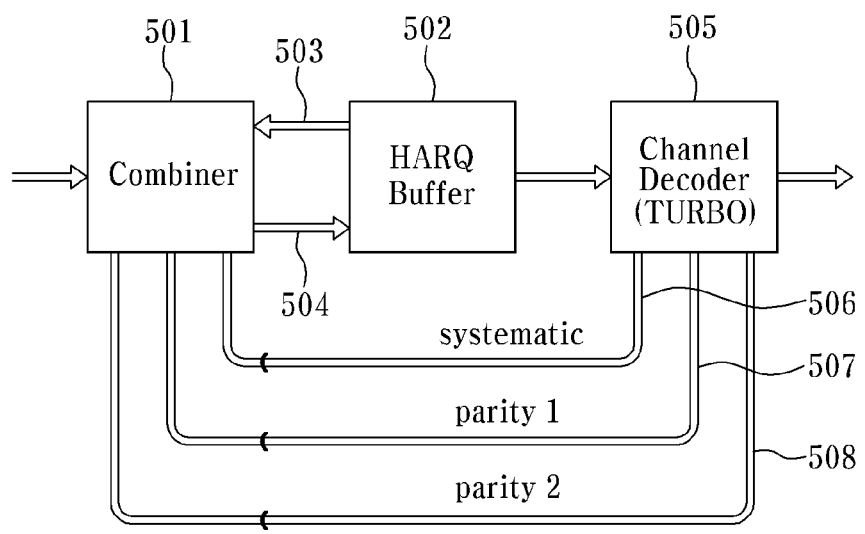
FIG. 5 is a configuration diagram of a HARQ device using a turbo decoder as the channel decoder in accordance with another embodiment of the present invention.

FIG. 5 is a configuration diagram of a HARQ device using a turbo decoder as the channel decoder in accordance with another embodiment of the present invention.

In general, the turbo decoder computes only an LLR for a systematic bit. In this case, the LLR for the systematic bit may be combined through a path 506. Furthermore, in the case of a turbo decoder computing LLRs for two parity bits (that is, forward order and interleaving order), the LLRs for the respective parity bits may be combined through paths 507 and 508.

At this time, the order of the combined LLRs may be rearranged or scaled according to the order of received data. Since the orders may differ depending on each case, the rearranging or scaling may be performed according to each condition.

Figure 6:
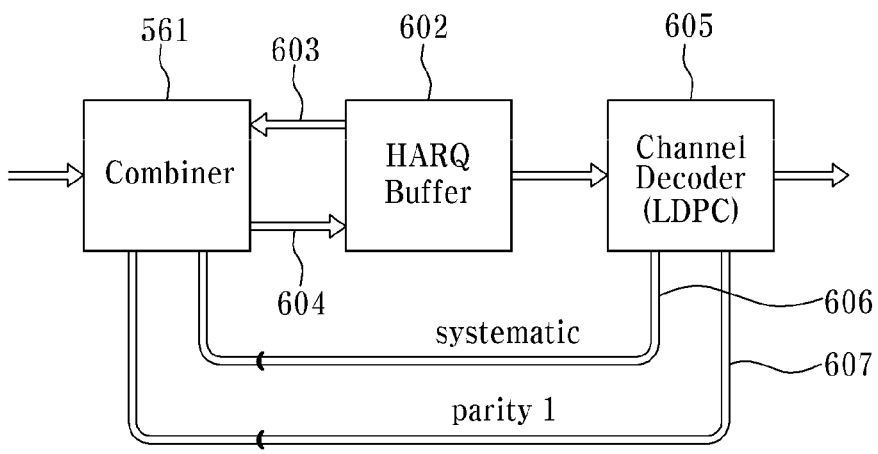
FIG. 6 is a configuration diagram of a HARQ device using an LDPC decoder as the channel decoder in accordance with another embodiment of the present invention.

FIG. 6 is a configuration diagram of a HARQ device using an LDPC decoder as the channel decoder in accordance with another embodiment of the present invention.

When the LCPD decoder is used as the channel decoder, an LLR for a systematic bit (path 606) and an LLR for a parity bit (path 607) may be used for combining. In this case, the order of the combined LLRs may be rearranged or scaled according to the order of the received data. Since the orders may differ depending on each case, the rearranging or scaling may be performed according to each condition.

As described above, when the HARQ scheme is performed according to the related art, the unique combining effect of the HARQ scheme and the coding gain may be obtained, but the data improved by the channel decoder cannot be used.

In order to use the high-quality data improved by the channel decoder, the packet combining devices in accordance with the embodiments of the present invention have an architecture capable of combining packets by using the channel decoder computing an LLR for a parity bit as well as an LLR for a systematic bit. Therefore, when the HARQ scheme is performed by using the packet combining devices in accordance with the embodiments of the present invention, it is possible to obtain the gain improved by the channel decoder as well as the unique combining effect of the HAQR scheme and the coding gain.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A packet combining device for a communication system using hybrid automatic repeat request (HARQ), comprising:
   a HARQ buffer having a first received data;
   a combiner having a second received data and configured to combine the first and second received data; and
   a channel decoder configured to,
      channel decode the combined first and second received data,
      compute one or more of log likelihood ratios (LLRs) for a systematic bit and a parity bit of the combined first and second received data, and
      provide to the combiner the one or more of LLRs to be combined with the combined first and second received data used for channel decoding.

2. The packet combining device of claim 1, wherein the first received data stored in the HARQ buffer is combined with the second received data after channel decoding of the first received data fails.

3. The packet combining device of claim 1, wherein the HARQ buffer is configured to store data, received from the combiner, obtained by combining the combined first and second received data with the one or more of the LLRs for the systematic bit and the parity bit.

4. The packet combining device of claim 1, wherein the channel decoder comprises an iterative decoder.

5. The packet combining device of claim 1, wherein the channel decoder uses one or more algorithms selected from the group consisting of BCH codes, Reed-Solomon codes, a SOVA, and a MAP algorithm.

6. A packet combining method for a communication system using HARQ, comprising:
   combining, by a combiner, a first received data previously received and stored in a HARQ buffer with a second received data;
   channel decoding, by a channel decoder, the combined first and second received data provided from the combiner;
   computing, by the channel decoder, one or more of LLRs for a systematic bit and a parity bit of the combined first and second received data; and
   combining, by the combiner, the one or more LLRs computed for a systematic bit and a parity bit with the combined first and second received data used for channel decoding, after channel decoding of the combined first and second received data fails.

7. The packet combining method of claim 6, wherein the method further comprises storing, by the HARQ buffer, results from combining the combined first and second received data, and the one or more of the LLRs computed for a systematic bit and a parity bit.

8. The packet combining method of claim 6, wherein the channel decoder comprises an iterative decoder.

9. The packet combining method of claim 6, wherein the channel decoder uses one or more algorithms selected from the group consisting of BCH codes, Reed Solomon codes, a SOVA, and a MAP algorithm.

10. The packet combining device of claim 3 wherein the combiner is configured to arrange the one or more of the LLRs for the systematic bit and the parity bit provided from the channel decoder, according to the order of the first and second received data.

11. The packet combining device of claim 3 wherein the combiner is configured to scale the one or more of the LLRs for the systematic bit and the parity bit provided from the channel decoder, according to the order of the first and second received data.

12. The packet combining method of claim 6 wherein the combiner arranges the one or more of the LLRs for the systematic bit and the parity bit provided from the channel decoder, according to the order of the first and second received data.

13. The packet combining method of claim 6 wherein the combiner scales the one or more of the LLRs for the systematic bit and the parity bit provided from the channel decoder, according to the order of the first and second received data.

* * * * *